United States Patent [19]

Steiner

[11] Patent Number: 5,745,866
[45] Date of Patent: Apr. 28, 1998

[54] CARDINAL-UP GRAPHIC MAP DISPLAY SYSTEM

[75] Inventor: Glenn C. Steiner, Los Altos, Calif.

[73] Assignee: Trimble Navigation Limited, Sunnyvale, Calif.

[21] Appl. No.: 584,347

[22] Filed: Jan. 9, 1996

[51] Int. Cl.$^6$ .............................. G06F 165/00; G09G 5/32
[52] U.S. Cl. ........................ 701/200; 701/207; 701/208; 701/216; 340/990; 340/995; 345/126
[58] Field of Search ................................ 364/443, 449.1, 364/449.2, 449.3, 449.4, 449.6, 449.7, 449.95, 450; 340/990, 988, 995; 342/357, 457; 395/137; 345/126

[56] References Cited

U.S. PATENT DOCUMENTS

| | | | |
|---|---|---|---|
| 4,527,155 | 7/1985 | Yamaki et al. | 345/126 |
| 4,796,191 | 1/1989 | Honey et al. | 364/450 |
| 4,914,605 | 4/1990 | Loughmiller, Jr. et al. | 364/518 |
| 4,970,682 | 11/1990 | Beckwith, Jr. et al. | 342/176 |
| 5,297,051 | 3/1994 | Arakawa et al. | 364/443 |
| 5,345,388 | 9/1994 | Kashiwazaki | 340/990 |
| 5,541,845 | 7/1996 | Klein | 364/449.1 |
| 5,552,989 | 9/1996 | Bertrand | 364/449.1 |

*Primary Examiner*—Tan Q. Nguyen
*Attorney, Agent, or Firm*—Wagner, Murabito & Hao

[57] ABSTRACT

A system, method, and apparatus for displaying map information in a cardinal direction-up setting. In one embodiment, map information is displayed on a display terminal. Next, an icon representing the position and heading of an item with respect to the displayed map information is placed over the displayed map information. In the present invention, the map information is displayed in a cardinal direction-up setting corresponding to the heading of the icon. Thus, if the heading of the icon is directed in a substantially eastern direction, the map information is displayed in an east-up orientation. The present invention further includes hysteresis logic which regulates when a different cardinal direction is oriented upward.

6 Claims, 4 Drawing Sheets

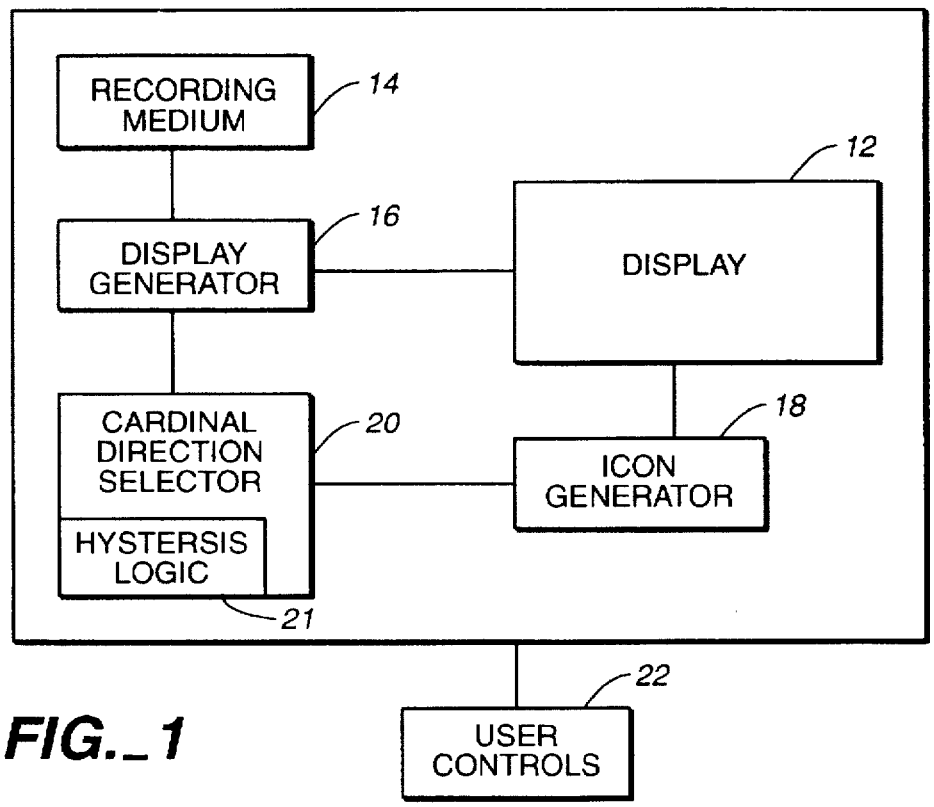
FIG._1
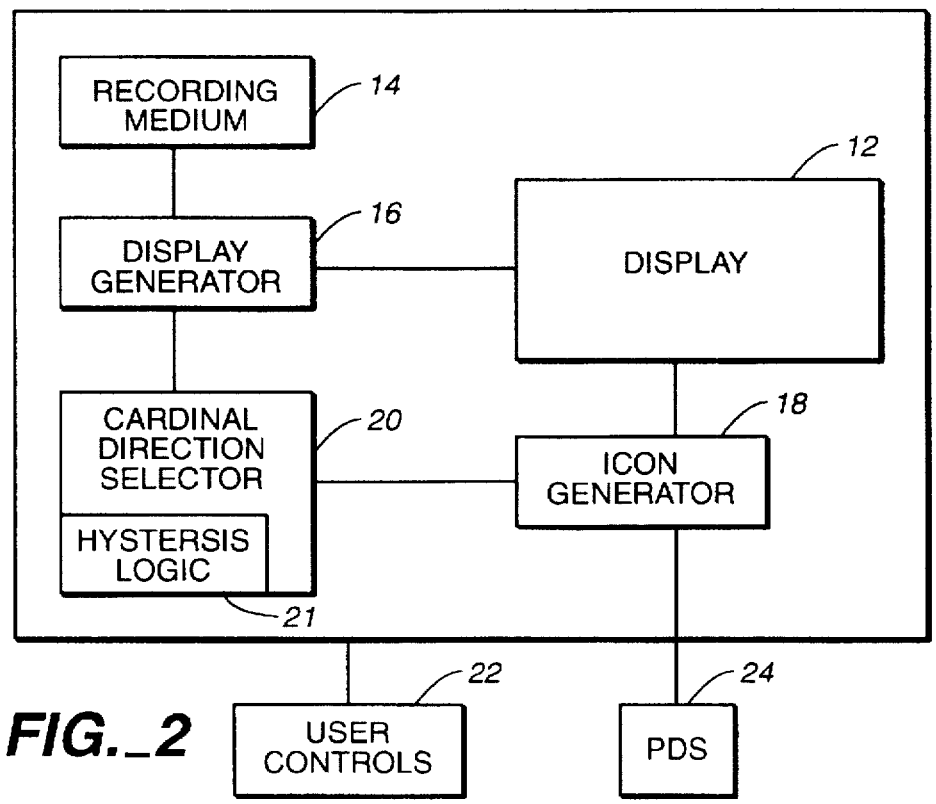
FIG._2

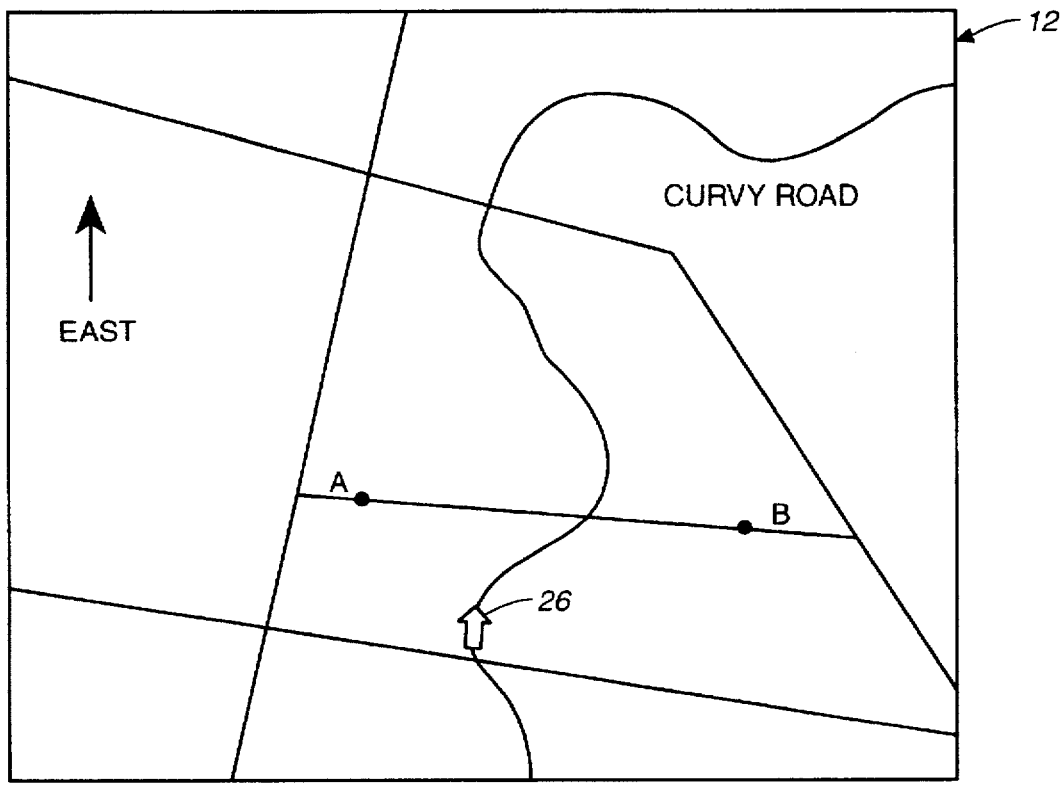
FIG._3
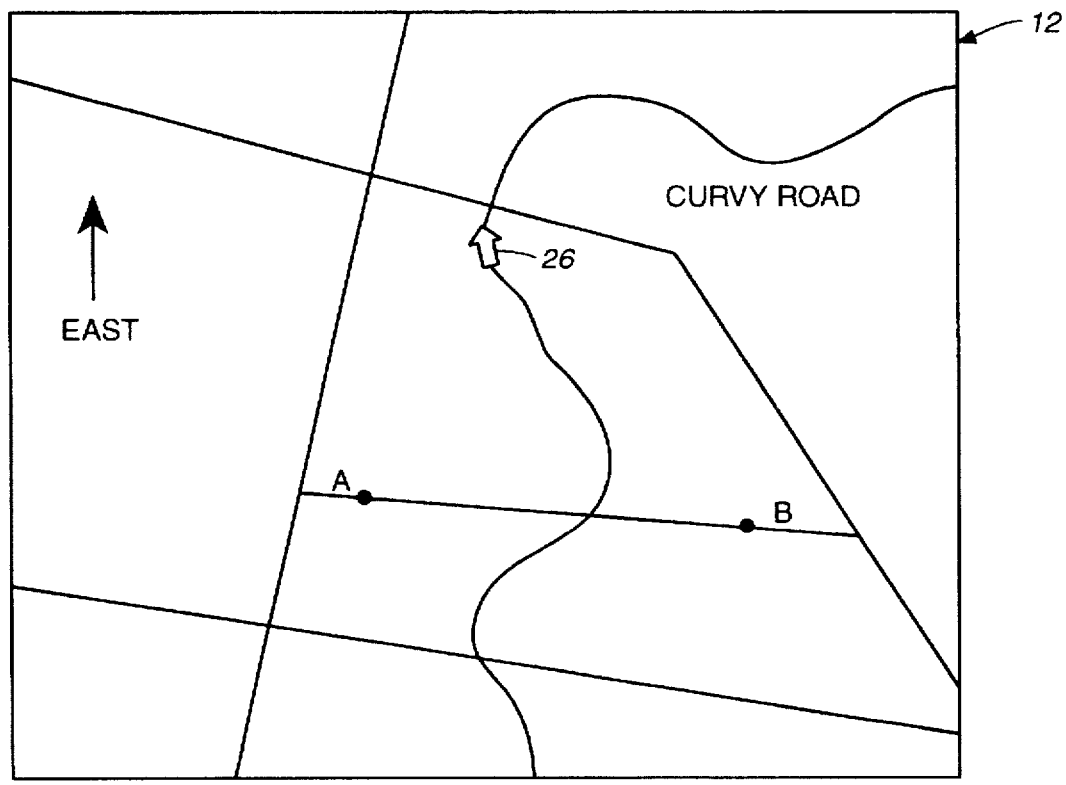
FIG._4

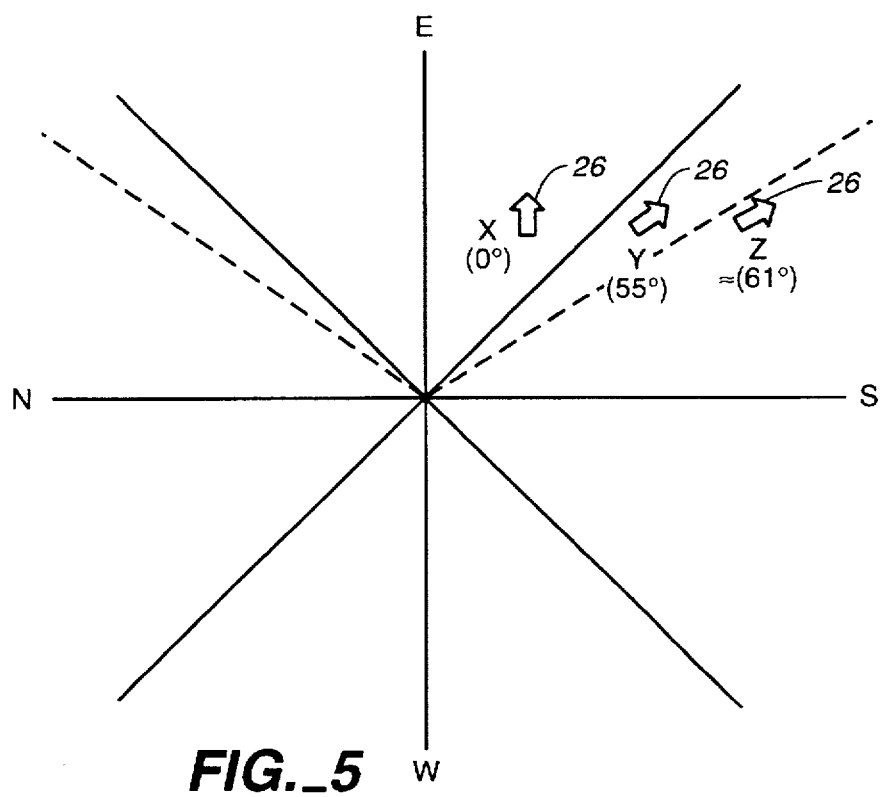
FIG._5
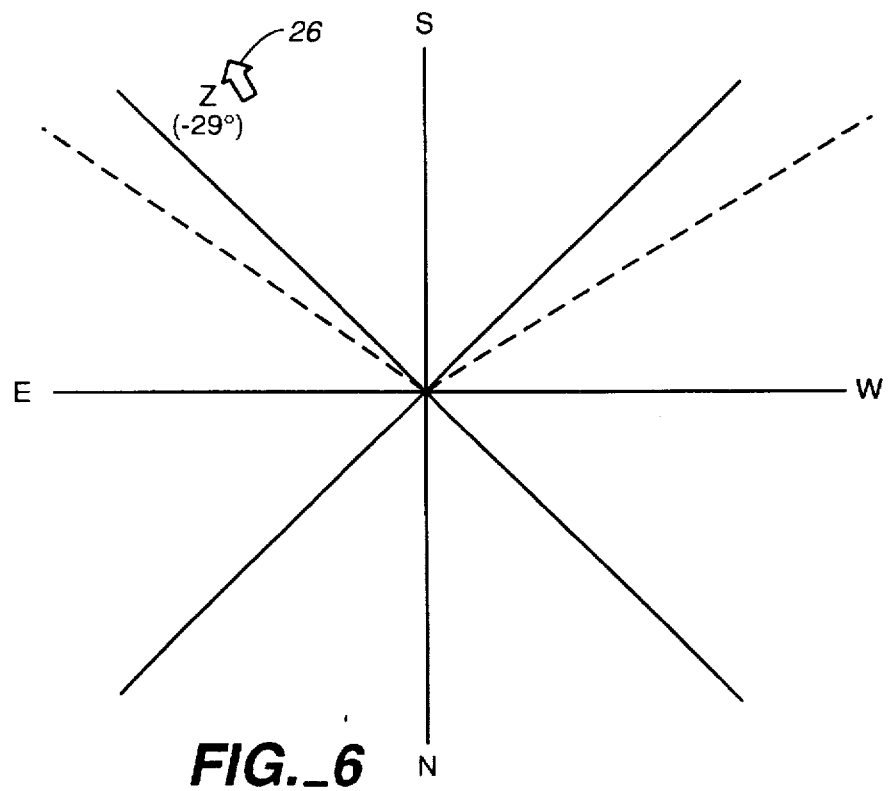
FIG._6

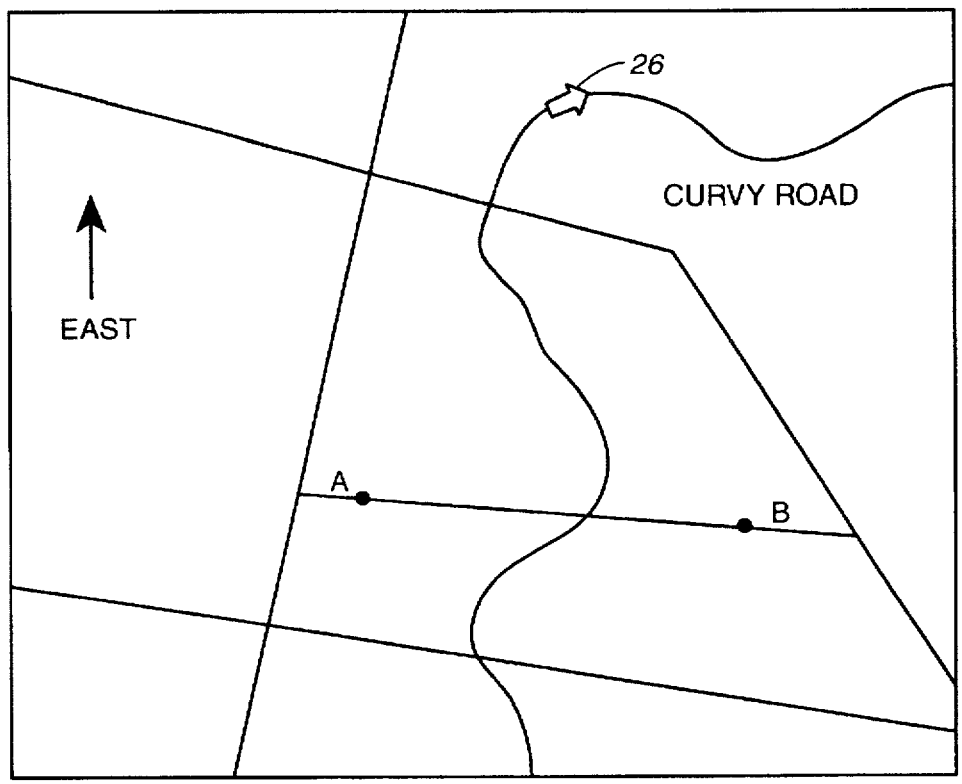
FIG._7
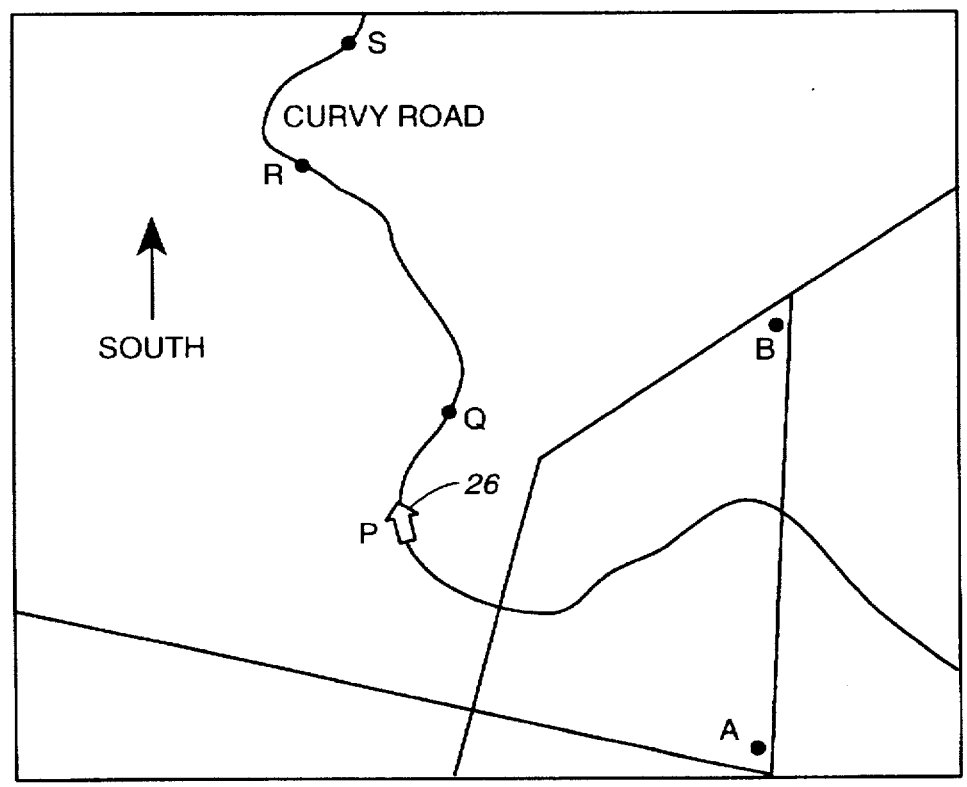
FIG._8

1

CARDINAL-UP GRAPHIC MAP DISPLAY SYSTEM

TECHNICAL FIELD

This invention relates to navigation systems. Specifically, the present invention relates to graphically displaying map information.

BACKGROUND ART

Navigational information display techniques are well known in the prior art. Two commonly used techniques are vector and raster/scanned displays. In either of the two commonly used techniques, the displayed navigation information such as, for example, a map is usually displayed on a display terminal. When displayed, the map frequently has a cursor or an arrow placed over the displayed map information. The cursor or arrow commonly represents the position of a selected object with respect to the displayed map. Unfortunately, prior art map display systems do not always provide a display which is clear and easy to understand for the average user.

Map display formats are usually divided into one of two categories, "heading-up", and "north-up". (For purposes of the present application, heading-up and track-up formats are considered together. Although slight differences exist between the two formats, it will be understood by those of ordinary skill in the art that the discussion contained herein pertains to both formats.) In a heading-up format, the cursor or arrow remains stationary on the displayed navigational information and points towards the top of the display screen. As the object changes actual position, the map moves underneath the stationary cursor or arrow such that the arrow or cursor remains located over the appropriate portion of the displayed map. That is, the map is rotated and moved corresponding to changes in the position of the object.

In a north-up format, the displayed map is always oriented with the north edge of the map situated at the top of the display screen. (Conventional paper maps are configured in a north-up orientation.) When the object changes actual position, the cursor or arrow moves about the display screen and over the surface of the stationary map. As the object turns, the icon on the map is rotated so as to point in the direction of travel of the object. Typically, when the cursor or arrow reaches the edge of the display screen, a new stationary map is re-drawn such that the cursor is arranged in the approximate center of the display screen. Examples of both prior art display formats can be found in U.S. Pat. No. 4,914,605 to Loughmiller Jr. et al., filed Feb. 8, 1989 entitled "Apparatus and method for displaying a map".

Several substantial problems exist with both heading-up and north-up display formats. In a heading up format, constant re-drawing or re-painting of the underlying map is required to insure that the appropriate portion of the map is placed beneath the cursor or arrow. Constant re-drawing of the underlying map information presents several problems. As the position of the displayed map continually changes, written information such as street names and the like must also be shifted or adjusted in position. The shifting of the position of the written information is necessary to ensure that the written information remains readable to the user. Thus, heading-up displays require constant re-drawing of the map information, and continual adjusting of the written information as well.

Another problem associated with heading-up displays is the extremely processor-intensive nature of such a display format. That is, continual re-drawing the map information and repeated shifting of the written text is extremely processor-intensive. Thus, such systems typically require more expensive hardware. Additionally, re-drawing of the map information uses processor time which could be allocated to other functions.

As another disadvantage, the constant re-drawing of the map information, required in a heading-up format, is both distracting and confusing to many users. For example, if the user looks away from the displayed map information for a brief period of time, when the user's view returns to the display newly re-drawn map information is present. Furthermore, if the object is, for example, a vehicle traveling along curvy road, the displayed map information will toggle back and forth as the vehicle makes each turn. Many users find such constantly changing information to be confusing and distracting.

In a north up display format, the cursor or arrow moves about the display screen. Although such a display format eliminates much of the re-drawing associated with heading-up configurations, the north-up format still has significant disadvantages. For example, when a vehicle is heading in a southerly direction, the cursor or arrow will be pointing southerly or towards the bottom of the display screen. In such an instance, if the driver looks at the displayed map and wishes to move the vehicle towards a location to the right of the cursor, a left turn of the vehicle is required. Likewise, if the driver of the vehicle wishes to move the vehicle towards a location to the left of the cursor, a right turn of the vehicle is required. (This problem is often handled by users of conventional paper maps by turning the paper map upside down.) Thus, north-up map display formats often confuse and sometimes misguide average users.

Thus, a need exists for a navigational information display system which: presents navigational information in a manner which is not confusing to the average user; reduces processor work loads; and eliminates excessive toggling between displayed navigational information.

DISCLOSURE OF THE INVENTION

It is therefore an object of the present invention to provide a navigation information display system which: presents navigational information in a manner which is not confusing to the average user; reduces processor work loads; and eliminates excessive toggling between displayed navigational information. The above object has been achieved by a cardinal direction-up navigational information display system. In one embodiment, a display such as, for example, a computer display terminal is used to display navigational information. The display is coupled to a database which contains navigational information. In one embodiment, the navigational information is, for example, map information. Next, a display generator, which is coupled to the database and the display terminal, locates the desired navigational information within the database and generates a graphic display of the desired navigational information on the display terminal.

The present invention then employs an icon generator coupled to the display terminal to generate an icon on the displayed navigational information. In the present embodiment, the icon represents the position and heading of an item with respect to the displayed navigational information. The present invention further includes a cardinal direction selector which orients the displayed navigational information in a cardinal direction-up setting corresponding to the heading of the icon. Thus, if the heading of the icon is directed in a substantially eastern direction, the navigational information is displayed in an east-up orientation. Likewise, if the heading of the icon is directed in a substantially southern direction, the navigational information is displayed in south-up orientation.

In another embodiment, the present invention includes hysteresis logic for regulating which cardinal direction, north, south, east, or west, is displayed in an upward orientation as the heading of the icon changes. As an example, in one embodiment, the hysteresis logic prevents the displayed navigational information from changing to a different cardinal direction-up setting until the heading of the icon substantially changes. That is, in one embodiment, the displayed navigational information remains in the current cardinal up setting until the heading of the icon is directed greater than 60 degrees in a clockwise direction from the cardinal direction presently being displayed, or until the heading of the icon is directed greater than 60 degrees in a counter-clockwise direction from the cardinal direction presently being displayed. By providing hysteresis logic, the present invention eliminates excessive toggling between navigational information displays. Additionally, by maintaining a cardinal direction-up setting, the displayed navigational information is less frequently re-drawn. By reducing the frequency at which the navigational information is re-drawn, the present invention reduces processor demand. Additionally, by consistently displaying the navigational information in a cardinal direction-up setting corresponding to the heading of the icon, the present invention presents the navigational information in a form which is user-friendly. Thus, the present invention presents navigational information in a manner which is not confusing to the average user, reduces processor work loads, and eliminates excessive toggling between displayed navigational information.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a schematic view of the hardware of a cardinal direction-up system in accordance with the present claimed invention.

FIG. 2 is a schematic view of the hardware of a cardinal direction-up system including a position determining system in accordance with the present claimed invention.

FIG. 3 is example of displayed navigational information in accordance with the present claimed invention.

FIG. 4 is example of displayed navigational information in accordance with the present claimed invention.

FIG. 5 is a directional diagram illustrating features associated with another embodiment of the present invention in which hysteresis logic is employed in accordance with the present claimed invention.

FIG. 6 is another directional diagram illustrating features associated with another embodiment of the present invention in which hysteresis logic is employed in accordance with the present claimed invention.

FIG. 7 is an example of map information displayed using hysteresis logic in accordance with the present claimed invention.

FIG. 8 is another example of map information displayed using hysteresis logic in accordance with the present claimed invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

With reference now to FIG. 1, a schematic view of one embodiment of the hardware of the present invention is shown. The following description of the present invention will begin with a detailed description of the physical characteristics of the present invention. This description will then be followed by a detailed description setting forth the operation of the present invention. Regarding the physical characteristics of the present embodiment, the present invention includes a computer 10 having a display terminal 12, recording medium 14, a display generator 16, an icon generator 18, and a cardinal direction selector 20. User controls 22 are shown coupled to computer 10. In the present embodiment, computer 10 is, for example, a PC or MAC computer well known and widely available in the art. Display terminal 12 is a CRT, LCD, or other type of display terminal suitable for use with computer 10. In the present embodiment, recording medium 14 is comprised of, for example CD ROM type recording media. Recording medium 14 contains navigational information such as, for example, a map database. The present invention is also well suited to the use of other types of recording media including, but not limited to cassette tapes, floppy disks, hard disks, and solid state recording media. The present invention is also well suited to having navigational information transmitted to computer 10 from an outside source such as service provider using any of numerous over-the-air communication techniques. In such an embodiment, recording medium 14 serves to store received navigation information. Furthermore, the present invention is also well suited for use with, for example, Personal Digital Assistants or other computing devices containing such features as a processor, memory, executable programs, a user input mechanism, and a user display mechanism.

With reference still to FIG. 1, display generator 16 is, for example, a processor for generating a graphic display of navigational information such as a map display and corresponding text. Display generators are well known in art and are commercially available, however, the present invention is also well suited to employing special circuitry and logic built to generate graphic displays of navigational information. Icon generator 18 is a processor for generating an icon onto display terminal 12. Icon generator 18 is also well suited to being integrated into display generator 16. Cardinal direction selector 20 contains logic for determining which cardinal direction will be displayed in an upward orientation on display terminal 12. Cardinal direction selector 20 also includes hysteresis logic 21. Although cardinal direction selector 20 includes hysteresis logic in the embodiments of FIGS. 1 and 2, the present invention is also well suited to utilizing cardinal direction selector 20 without hysteresis logic. As shown in FIG. 1, cardinal direction selector 20 is coupled to both display generator 16 and icon generator 18. The present embodiment farther includes user controls 22 to allow a user to interact with computer 10.

With reference next to FIG. 2, a schematic diagram of another embodiment of the present invention is shown in which a position determining system (PDS) 24 is coupled to computer 10. In the present embodiment, PDS 24 is, for example, a satellite-based radio navigation system such as the Global Positioning System (GPS), or the Global Orbiting Navigational Satellite System (GLONASS). Although such systems are specifically mentioned in the present embodiment, the present invention is also well suited to land-based radio navigation systems such as, for example, LORAN, and Decca. The present invention is also well suited for use with Dead Reckoning, differential odometry, altitude, and magnetic heading based systems. Additionally, the present invention is also well suited to receiving differential corrections and to recording GPS ephemeris data. In the present embodiment, PDS is hardwire connected to computer 10. Although PDS 24 is hardwire connected to computer 10 in the present embodiment, the present invention is also well suited to having PDS communicatively coupled to computer 10 using any of numerous over-the-air communication techniques.

IN OPERATION

The following is a detailed description of the operation of the present invention. As stated above, prior art navigation systems commonly display map information in either a heading-up or north-up display format. Such display formats are, however, not always satisfactory for various reasons described above in detail. With reference to FIG. 2, during operation, computer 10 of the present invention is disposed, for example, within a vehicle. Navigational information stored within recording medium 14 is accessed by display generator 16. Display generator 16 generates a visual representation of the navigational information, and displays the navigational information such as a map, for example, on display terminal 12. As the vehicle moves along, PDS 24 determines the position information of vehicle 24. The position information is then used by icon generator 18 to place an icon representing the vehicle on the map at the position where the vehicle is currently located. Cardinal direction selector 20 then causes the navigational information on display terminal 12 to be displayed in a cardinal direction-up orientation corresponding to the heading of the icon. For example, if the heading of the icon is directed in a substantially eastern direction, the navigational information is displayed in "east-up" orientation. Likewise, if the icon is directed in a substantially western direction, the navigational information is displayed in a "west-up" orientation. For purposes of the present application, a cardinal direction is also defined as any direction or degree of orientation selected or determined by the user. For example, the cardinal direction can be defined as the directions offset by 30 degrees from North, South, East and West, the directions offset by 45 degrees from North, South, East and West, 60 degrees from North, South, East and West, and the like. Likewise, the present invention is also well suited to having more than four cardinal angles. That is, the presetn invention is well suited to having a cardinal angle every 60 degrees, every 30 degrees, and the like.

With reference next to FIG. 3, an example of map information displayed in accordance with the present invention for an eastern-heading vehicle is shown. As shown in FIG. 3, the example of the present embodiment includes a icon 26 representing the position and heading of, for example a vehicle with respect to the displayed map. In the present example, the heading of icon 26 is directed in a substantially eastern direction along "Curvy Road". Thus, cardinal direction selector 20 of FIGS. 1 and 2 orients the displayed navigational information in an east-up orientation.

Several advantages are realized by the cardinal direction-up format of the present invention. As shown in FIG. 3, by orienting the navigation information in an east-up format, the location of items with respect to icon 26 is easily determined. For example, it is very clear to a user of the present invention that a right hand turn is required to reach item B. Likewise, it is intuitive to a user of the present invention that a left hand turn is required to reach item A. In a prior art north-up display format, an arrow or cursor representing the vehicle would be headed towards the right side of the display. Additionally, in such a prior art display format, items A and B would be located above and below the icon. Thus, the present invention eliminates much of the confusion associated with prior art north-up display formats.

With reference next to FIG. 4, icon 26 has progressed towards the top of display terminal 12 along Curvy Road. Even though several turns and bends have been encountered, the present invention still displays the navigation information in an east-up format. In the present invention, as long as the heading of icon 26 is directed in a substantially eastern direction, the displayed navigational information remains in an east-up orientation. That is, the cardinal direction-up setting of the present invention prevents display terminal 12 from toggling or re-drawing a new screen each time a slight change in the heading of icon 26 occurs. In prior art heading-up display formats, the displayed navigational information is re-drawn at each slight change in the heading of icon 26. The repeated re-drawing associated with prior art heading-up display formats is extremely processor-intensive and is often confusing or distracting to the user. Thus, the present invention reduces processor work loads, and eliminates excessive toggling between displayed navigational information.

In one embodiment of the present invention, the cardinal direction presently displayed in a upward orientation remains displayed in an upward orientation until the heading of icon 26 is directed away from the selected cardinal direction by farther than approximately ±45 degrees.

With reference next to FIG. 5, a directional diagram illustrating features associated with another embodiment of the present invention is shown. In the present embodiment, hysteresis logic 21 of FIGS. 1 and 2 regulates the point at which a change in the heading of icon 26 causes a new cardinal direction to be displayed in an upward orientation. Specifically, in the present embodiment, hysteresis logic 21 prevents the displayed navigational information from changing to a different cardinal direction-up setting until the heading of the icon 26 is directed farther than ±60 degrees from the cardinal direction presently being displayed. Therefore, as shown in FIG. 5, when icon 26 has a heading as shown at point X, the navigational information is displayed in an east-up orientation. When the heading of icon 26 changes to +55 degrees from the east direction as shown at point Y, the navigational information remains in an east-up orientation. Only when the heading of icon 26 is directed farther than +60 degrees from the east as shown at point Z, does the displayed navigational information change to a new cardinal direction-up setting. Although a hysteresis variance of ±60 degrees is used in the present embodiment, the present invention is also well suited to using various other setting for the hysteresis variance. As an example, the present invention is also wells suited to using a hysteresis variance of +⅔ of the cardinal angle. Thus, if the difference between selected cardinal angles is 90 degrees, then the hysteresis variance is 60 degrees. Likewise, if the difference between selected cardinal angles is 60 degrees, then the hysteresis variance is 40 degrees.

As shown in FIG. 5, once the heading of icon 26 is directed approximately +61 degrees from the east, icon 26 is, consequently, headed approximately −29 degrees from the south. Thus, when the displayed navigational information is switched to a south-up orientation, icon 26 will have a heading directed at approximately −29 degrees from vertical.

With reference next to FIG. 6, another directional diagram is shown. FIG. 6 illustrates the position of icon 26 in a south-up setting immediately after icon 26 was at the heading of point Z in FIG. 5. As shown in FIG. 6, after the displayed navigational information has switched from an east-up to a south-up setting, substantial change in the heading of icon 26 must occur before a new cardinal direction is oriented upward. By utilizing hysteresis logic 21, the heading of icon 26 must change by approximately +89 degrees before a new cardinal direction, west, is oriented upward. Likewise, the heading of icon 26 must change by farther than −31 degrees before a new cardinal direction, east, is oriented upward. That is, the present invention eliminates the possibility of repeated toggling between cardinal direction-up settings when the heading of the icon fluctuates from being slightly more to being slightly less than ±45 degrees from the cardinal direction oriented upward. Thus, by providing hysteresis logic 21 of FIGS. 1 and 2, the present invention eliminates excessive toggling between displayed navigational information. Therefore, the displayed navigational information is less frequently re-drawn. By reducing the frequency at which the displayed navigational information is re-drawn, the present invention reduces processor demand, and reduces potential user confusion.

With reference next to FIG. 7, an example of navigational information displayed in accordance with the present invention including hysteresis logic is shown. When icon 26 reaches point P on Curvy Road, icon 26 has a heading of greater than +60 degrees from east. Thus, at point P the displayed navigational information is switched to a south-up setting, as shown in FIG. 8. As shown in FIG. 8, when the displayed navigational information is changed to a new setting, the newly displayed navigational information is graphically displayed such that icon 26 is placed near the center of display terminal 12. Likewise, when icon 26 nears or reaches the edge of display terminal 12, the newly displayed navigational information is displayed such that icon 26 is placed near the center of display terminal 12.

With reference still to FIG. 8, hysteresis logic 21 of FIGS. 1 and 2 prevents the displayed navigational information from toggling to a new cardinal direction-up setting until the heading of icon 26 changes substantially. Therefore, in the present invention, the displayed navigational information remains in a south-up orientation even at points Q, R, and S. That is, until the heading of icon 26 is directed farther than ±60 degrees from south, the navigation information remains in a south-up orientation.

Thus, the present invention presents navigational information in a manner which is not confusing to the average user, reduces processor work loads, and eliminates excessive toggling between displayed navigational information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An apparatus for graphically displaying navigational information comprising:

a display;

a database containing navigational information;

a display generator coupled to said database and said display, said display generator generating a graphical display of said navigational information on said display;

an icon generator coupled to said display, said icon generator providing on said graphical display of said navigational information an icon representing the position and heading of an item; and a cardinal direction selector coupled to said icon generator and said display generator, said cardinal direction selector causing said graphical display of said navigational information to be displayed in a cardinal direction-up setting wherein said cardinal direction-up setting corresponds to said heading of said icon, said cardinal direction selector including hysteresis logic regulating which cardinal direction is displayed in an upward orientation as said heading of said icon changes, said hysteresis logic preventing said graphical display of said navigational information from changing to a different cardinal direction-up setting until said heading of icon is directed greater than 60 degrees in a clockwise direction from the cardinal direction presently being displayed in an upward orientation or until said heading of said icon is directed greater than 60 degrees in a counter-clockwise direction from said cardinal direction presently being displayed in an upward orientation.

2. An apparatus for graphically displaying navigational information comprising:

a display;

a database containing navigational information;

a display generator coupled to said database and said display, said display generator generating a graphical display of said navigational information on said display;

an icon generator coupled to said display, said icon generator providing on said graphical display of said navigational information an icon representing the position and heading of an item; and a cardinal direction selector coupled to said icon generator and said display generator, said cardinal direction selector causing said graphical display of said navigational information to be displayed in a cardinal direction-up setting wherein said cardinal direction-up setting corresponds to said heading of said icon, said cardinal direction selector including hysteresis logic regulating which cardinal direction is displayed in an upward orientation as said heading of said icon changes, said hysteresis logic preventing said graphical display of said navigational information from changing to a different cardinal direction-up setting until said heading of icon varies by more than ⅔ of the degrees separating said selected cardinal directions.

3. A system for displaying map information comprising:

a display;

a database containing map information;

a display generator coupled to said database and said display, said display generator generating a visual display of said map information on said display;

an icon generator coupled to said display, said icon generator providing on said visual display of said map information an icon representing the position and heading of an item with respect to said visually displayed map information; and a cardinal direction selector coupled to said icon generator and said display generator, said cardinal direction selector causing said visual display of said map information to be displayed in a cardinal direction-up setting wherein said cardinal direction-up setting corresponds to said heading of said icon, said cardinal direction selector including hysteresis logic regulating which cardinal direction is displayed in an upward orientation as said heading of said icon changes, said hysteresis logic preventing said visual display of said map information from changing to a different cardinal direction-up setting until said heading of icon is directed greater than 60 degrees in a clockwise direction from the cardinal direction presently being displayed in an upward orientation or until said heading of said icon is directed greater than 60 degrees in a counter-clockwise direction from said cardinal direction presently being displayed in an upward orientation.

4. A system for displaying map information comprising:

a display;

a database containing map information;

a display generator coupled to said database and said display, said display generator generating a visual display of said map information on said display;

an icon generator coupled to said display, said icon generator providing on said visual display of said map information an icon representing the position and heading of an item with respect to said visually displayed map information; and a cardinal direction selector coupled to said icon generator and said display generator, said cardinal direction selector causing said visual display of said map information to be displayed in a cardinal direction-up setting wherein said cardinal direction-up setting corresponds to said heading of said icon, said cardinal direction selector including hysteresis logic regulating which cardinal direction is displayed in an upward orientation as said heading of said icon changes, said hysteresis logic preventing said visual display of said map navigational information from changing to a different cardinal direction-up setting until said heading of icon varies by more than ⅔ of the degrees separating said selected cardinal directions.

5. A method for displaying navigational information on a display comprising the steps of:

displaying map information on a display;

generating an icon on said display, said icon representing the position and heading of an item with respect to said displayed map information; and orienting said displayed map information in a cardinal direction-up setting, said cardinal direction-up setting corresponding to said heading of said icon, said orienting of said displayed map information in a cardinal direction-up setting further comprising the step of:

applying hysteresis factors in determining which cardinal direction is displayed in an upward orientation as said heading of said icon changes, said step of applying hysteresis factors further comprising:

preventing said map information displayed on said display from changing to a different cardinal direction-up setting until said heading of icon is directed greater than 60 degrees in a clockwise direction from the cardinal direction presently being displayed in an upward orientation or until said heading of said icon is directed greater than 60 degrees in a counter-clockwise direction from said cardinal direction presently being displayed in an upward orientation.

6. A method for displaying navigational information on a display comprising the steps of:

displaying map information on a display;

generating an icon on said display, said icon representing the position and heading of an item with respect to said displayed map information; and orienting said displayed map information in a cardinal direction-up setting, said cardinal direction-up setting corresponding to said heading of said icon, said orienting of said displayed map information in a cardinal direction-up setting further comprising the step of:

applying hysteresis factors in determining which cardinal direction is displayed in an upward orientation as said heading of said icon changes, said step of applying hysteresis factors further comprising the step of:

preventing said map information displayed on said display from changing to a different cardinal direction-up setting until said heading of icon varies by more than ⅔ of the degrees separating said selected cardinal directions.

* * * * *